(12) United States Patent
Setomoto et al.

(10) Patent No.: US 10,114,452 B2
(45) Date of Patent: Oct. 30, 2018

(54) MOTION DETECTION SYSTEM

(71) Applicant: Panasonic Intellectual Property Management Co., Ltd., Osaka (JP)

(72) Inventors: Tatsumi Setomoto, Osaka (JP); Akihiro Kishimoto, Osaka (JP); Itaru Onishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 170 days.

(21) Appl. No.: 15/048,139

(22) Filed: Feb. 19, 2016

(65) Prior Publication Data

US 2016/0267676 A1 Sep. 15, 2016

(30) Foreign Application Priority Data

Mar. 11, 2015 (JP) ................. 2015-048885

(51) Int. Cl.
*G06F 3/00* (2006.01)
*G06T 7/00* (2017.01)
*G06K 9/00* (2006.01)
*G06F 3/01* (2006.01)
*A63F 13/213* (2014.01)
(Continued)

(52) U.S. Cl.
CPC ............ *G06F 3/011* (2013.01); *A63F 13/213* (2014.09); *A63F 13/42* (2014.09); *A63F 13/655* (2014.09); *G06F 3/017* (2013.01); *G06K 9/00369* (2013.01); *G06K 9/00771* (2013.01); *G06K 9/2036* (2013.01); *G06K 9/6204* (2013.01); *G06T 7/521* (2017.01); *G06T 7/75* (2017.01); *G06T 2207/10016* (2013.01); *G06T 2207/10048* (2013.01); *G06T 2207/30196* (2013.01);
(Continued)

(58) Field of Classification Search
CPC .......... G06F 3/11; G06T 7/75; G06K 9/00769
USPC .......................................................... 348/77
See application file for complete search history.

(56) References Cited

U.S. PATENT DOCUMENTS 5,818,733 A 10/1998 Hyuga
7,466,359 B2 12/2008 Enomoto et al.
(Continued)

FOREIGN PATENT DOCUMENTS

JP 07-282235 A 10/1995
JP 08-067204 A 3/1996
(Continued)

*Primary Examiner* — Jeffery A Williams
(74) *Attorney, Agent, or Firm* — Renner, Otto, Boisselle & Sklar, LLP

(57) ABSTRACT

A motion detection system including: an infrared light source that emits infrared rays; a camera that captures a subject using infrared rays reflected by the subject; a memory that stores a plurality of pieces of outline data an output device that outputs information associated with a state of the subject; and a controller that controls the infrared light source, the camera, the memory, and the output device, wherein the controller performs the following: makes a comparison between an outline of the subject captured by the camera and the pieces of outline data; selects, from among the pieces of outline data, a piece of outline data which resembles the outline of the subject captured by the camera; and causes the output device to output information associated with a state of the subject corresponding to the selected piece of outline data.

6 Claims, 9 Drawing Sheets

(51) Int. Cl.
*G06K 9/20* (2006.01)
*G06K 9/62* (2006.01)
*A63F 13/655* (2014.01)
*A63F 13/42* (2014.01)
*G06T 7/73* (2017.01)
*G06T 7/521* (2017.01)
*H04N 5/33* (2006.01)
*H04N 5/225* (2006.01)

(52) U.S. Cl.
CPC .. *G06T 2207/30232* (2013.01); *H04N 5/2256* (2013.01); *H04N 5/33* (2013.01)

(56) References Cited

U.S. PATENT DOCUMENTS

| | | |
|---|---|---|
| 8,050,461 B2 | 11/2011 | Shpunt et al. |
| 8,374,397 B2 | 2/2013 | Shpunt et al. |
| 8,390,821 B2 | 3/2013 | Shpunt et al. |
| 8,400,494 B2 | 3/2013 | Zalevsky et al. |
| 9,063,283 B2 | 6/2015 | Shpunt et al. |
| 9,066,084 B2 | 6/2015 | Zalevsky et al. |
| 2005/0220450 A1 | 10/2005 | Enomoto et al. |
| 2007/0230744 A1* | 10/2007 | Dronge ............. G08B 13/194 382/103 |
| 2008/0106746 A1 | 5/2008 | Shpunt et al. |
| 2009/0096783 A1 | 4/2009 | Shpunt et al. |
| 2010/0177164 A1 | 7/2010 | Zalevsky et al. |
| 2011/0096182 A1 | 4/2011 | Cohen et al. |
| 2011/0158508 A1 | 6/2011 | Shpunt et al. |
| 2012/0105193 A1* | 5/2012 | Gritti .................... G08B 13/00 340/3.4 |
| 2012/0281240 A1 | 11/2012 | Cohen et al. |
| 2013/0136305 A1 | 5/2013 | Shpunt et al. |
| 2013/0155195 A1 | 6/2013 | Zalevsky et al. |
| 2013/0162778 A1* | 6/2013 | Kurokawa ............ H04N 13/02 348/46 |
| 2014/0043160 A1* | 2/2014 | Holowick ................ G01J 5/06 340/568.1 |
| 2015/0287205 A1 | 10/2015 | Zalevsky et al. |

FOREIGN PATENT DOCUMENTS

| | | |
|---|---|---|
| JP | 2005-295442 A | 10/2005 |
| JP | 2008-016289 A | 1/2008 |
| JP | 2009-511897 A | 3/2009 |
| JP | 2011-055397 A | 3/2011 |
| JP | 2011-073353 A | 4/2011 |
| JP | 2014-042156 A | 3/2014 |
| JP | 2014-181907 A | 9/2014 |
| WO | WO 96/01539 | 1/1996 |
| WO | WO 2007/043036 A1 | 4/2007 |

* cited by examiner

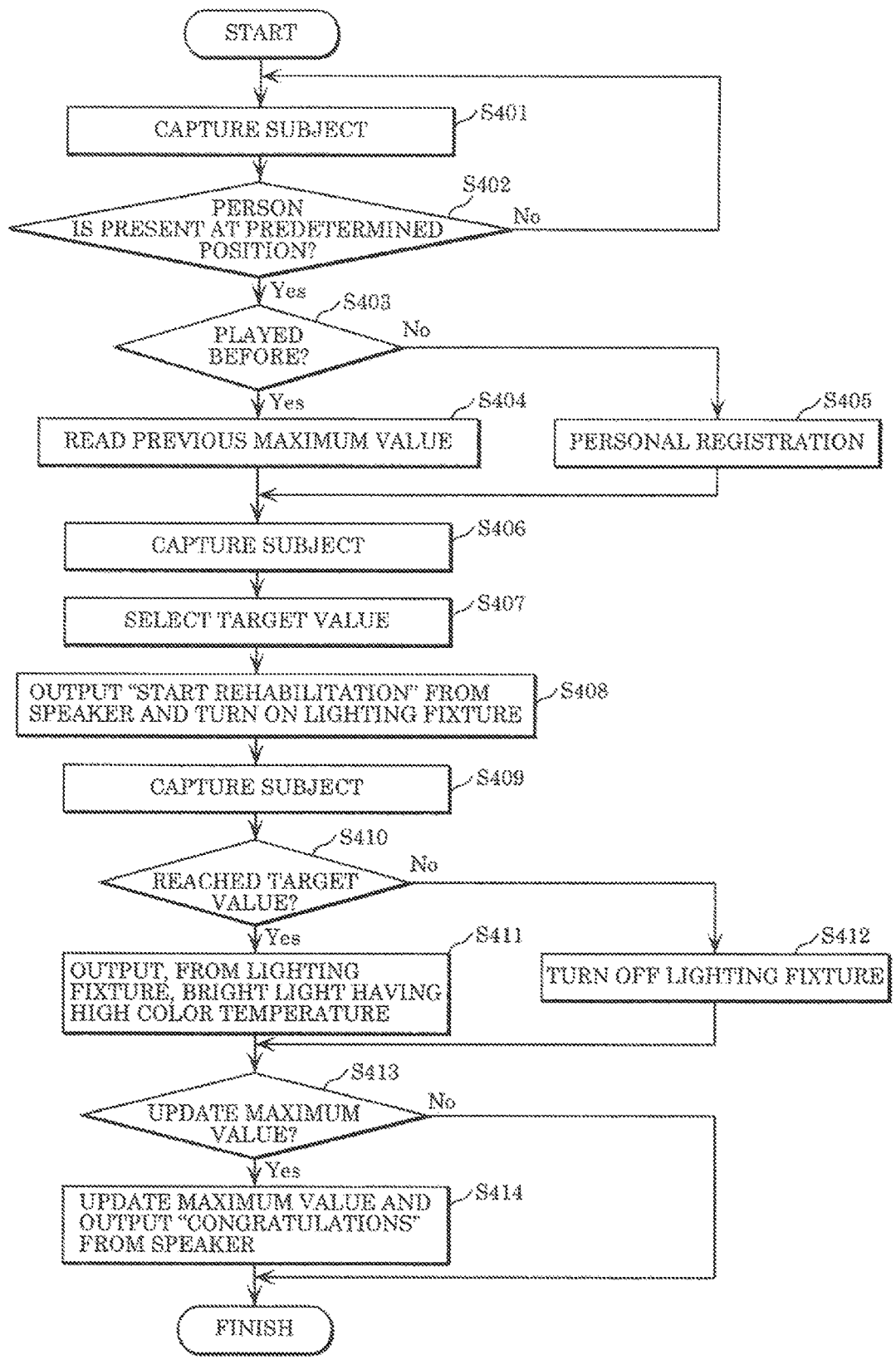

MOTION DETECTION SYSTEM

CROSS REFERENCE TO RELATED APPLICATION

This application claims the benefit of priority of Japanese Patent Application Number 2015-048885 filed on Mar. 11, 2015, the entire content of which is hereby incorporated by reference.

BACKGROUND

1. Technical Field

The present disclosure relates to motion detection systems.

2. Description of the Related Art

There are motion detection systems that use a camera. The camera captures the detailed shape of an object, and the captured shape of the object is shown on a display, for example. For example, Japanese Unexamined Patent Application Publication No. 2009-511897 (Patent Literature 1 (PTL 1)) discloses a technique related to such a motion detection system.

SUMMARY

With the technique of PTL 1 or the like, the shape of the object is shown as it is on the display, for example, and thus the characteristics of the object can be appropriately distinguished. Therefore, the motion detection system can be used for security purposes, for example.

However, in the case of using the motion detection system for purposes other than security, it is unnecessary to clearly show the detailed body shape, expression, or the like, of a person. For example, in the case of using the motion detection system for detecting the state of a person, such as collapsing or raising a hand, in a place such as a hospital, a care facility, or a toilet, the motion detection system needs to be privacy-conscious.

In view of this, it is an object of the present disclosure to provide a motion detection system that can detect the state of a subject while being privacy-conscious.

A motion detection system according to an aspect of the present disclosure is a motion detection system that detects a subject and includes: an infrared light source that emits a plurality of infrared rays in a spatially-dispersed manner; a camera that captures the subject using, among the plurality of infrared rays emitted by the infrared light source, infrared rays reflected by the subject; a memory that stores a plurality of pieces of outline data corresponding to a plurality of predetermined states of the subject; an output device that outputs information associated with a state of the subject; and a controller that controls the infrared light source, the camera, the memory, and the output device, wherein the controller performs the following: makes a comparison between an outline of the subject captured by the camera and the plurality of pieces of outline data stored in the memory; selects, from among the plurality of pieces of outline data, a piece of outline data which resembles the outline of the subject captured by the camera; and causes the output device to output information associated with a state of the subject corresponding to the selected piece of outline data.

The motion detection system according to an aspect of the present disclosure can detect the state of a subject while being privacy-conscious.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 11 is a flow chart illustrating the operation of a rehabilitation game to which a motion detection system according to Embodiment 2 is applied.

DETAILED DESCRIPTION OF EMBODIMENTS

Figure 1:
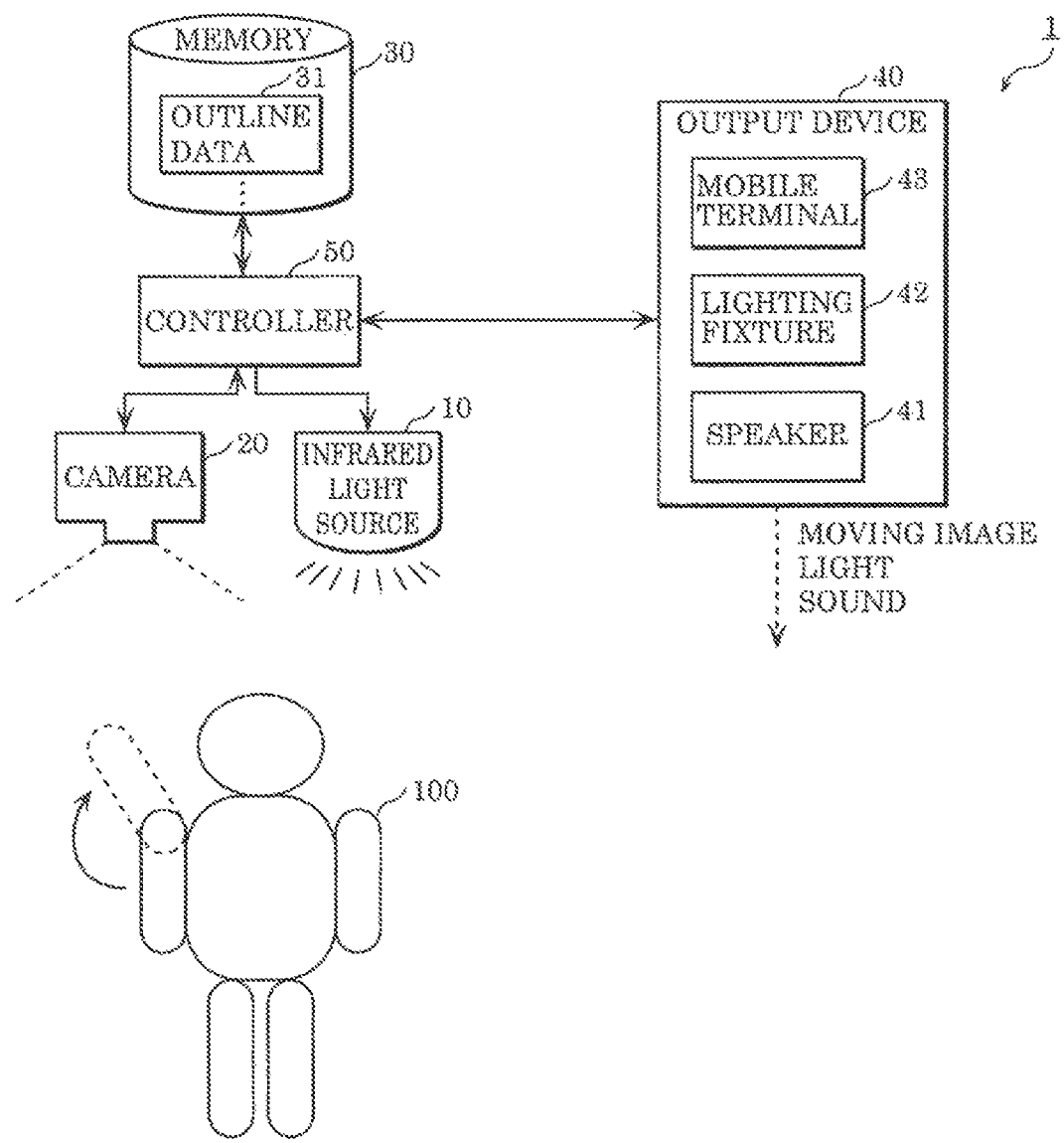
FIG. 1 illustrates an example of the structure of a motion detection system according to Embodiment 1.

Hereinafter, a motion detection system according to embodiments of the present disclosure will be described in detail with reference to the accompanying drawings. Each of the following embodiments describes a preferred, specific example of the present disclosure. Therefore, the numerical values, shapes, materials, structural elements, arrangement and connection of the structural elements, etc., shown in the following embodiments are mere examples, and are not intended to limit the present disclosure. Thus, among the structural elements in the following embodiments, structural elements not recited in any one of the independent claims which indicate the broadest concepts of the present disclosure will be described as arbitrary structural elements.

Furthermore, each drawing illustrates a schematic diagram and is not necessarily a precise illustration. In the drawings, the same structural elements are given the same reference signs.

[Embodiment 1]

Hereinafter, Embodiment 1 will be described with reference to FIG. 1 to FIG. 8.

[Structure]

FIG. 1 illustrates an example of the structure of motion detection system 1 according to Embodiment 1. Motion detection system 1 is used in a care facility such as a nursing home, a hospital room, or a toilet, for example.

Motion detection system 1 includes infrared light source 10, camera 20, memory 30, output device 40, and controller 50. Motion detection system 1. detects subject 100. More specifically, motion detection system 1 detects the state of subject 100. Subject 100 is, for example, a person, and motion detection system 1 detects the state of a person. The state of a person is, for example, raising a hand, collapsing, or sitting. Furthermore, motion detection system 1 detects whether or not a person is present in a space, for example. In the case where no person is present in a space, motion detection system 1 detects that no person is present in the space. In the case where one or more persons are present in the space, motion detection system 1 detects the number of persons present in the space. That is to say, motion detection system 1 detects the state of a person, whether or not a person is present, the number of persons, and so on, as the state of subject 100.

Figure 2:
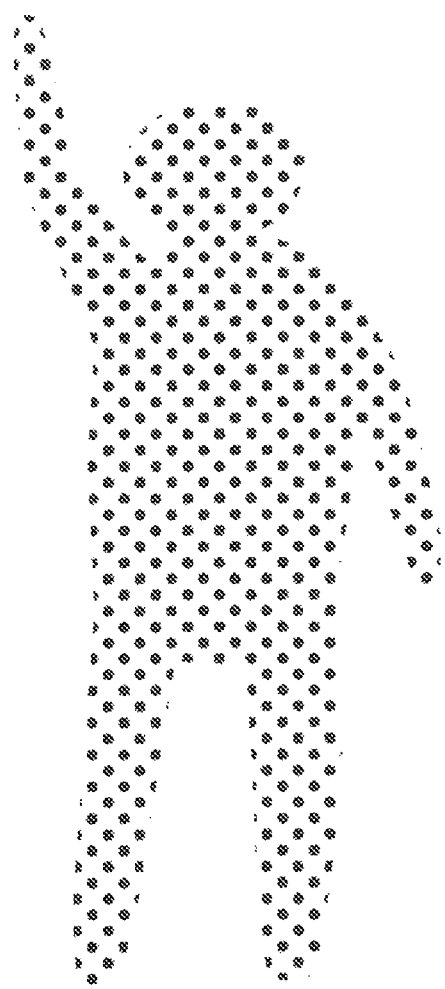
FIG. 2 illustrates an example of a subject captured by a camera according to Embodiment 1.
Figure 3:
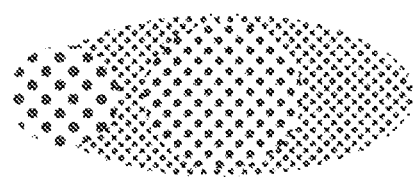
FIG. 3 illustrates an example of a subject captured by a camera according to Embodiment 1.

Infrared, light source 10 is a light source that emits a plurality of infrared rays in a spatially-dispersed manner. Infrared light source 10 emits a plurality of infrared rays in a spatially-dispersed manner toward subject 100. Here, the infrared rays emitted by infrared light source 10 are near-infrared rays having a wavelength in a range from 780 nm to 1000 nm inclusive, for example. The plurality of infrared rays means a plurality of beams of infrared radiation, for example. Each of the plurality of infrared rays emitted by infrared light source 10 has high directivity like a laser, for example. The light source may be made up of an array of individual LEDs, each with a lens which focuses the light emitted from the LED into a given infrared ray. The directions of the rays from the respective LEDs are arranged so as to be distributed across the field-of-view. Alternatively, the light source may be made up of a single laser having a beam which is scanned across the field-of-view while simultaneously pulsed on and off to create individual rays or spots on the object. Therefore, infrared light source 10 emits a plurality of infrared rays irradiating as dots like a laser, in a spatially-dispersed manner toward subject 100. When such infrared rays are emitted in a spatially-dispersed manner toward subject 100, subject 100 is rendered with multiple dots as illustrated in. FIG. 2 and FIG. 3, which are to be described later. Infrared light source 10 is mounted on a wall or ceiling of the care facility, hospital, or toilet, for example.

Camera 20 captures subject 100 using infrared rays reflected by subject 100. More specifically, camera 20 captures subject 100 which has reflected some of the plurality of infrared rays emitted by infrared light source 10 and is rendered with multiple dots. Subject 100 captured by camera 20 and rendered with multiple dots will be described later with reference to FIG. 2 and FIG. 3. Camera 20 is, for example, an infrared, camera having an infrared sensor. Camera 20 is mounted on a wall or ceiling of the care facility, hospital, or toilet, for example.

Memory 30 is, for example, a nonvolatile memory (e.g., read-only-memory (ROM)) that stores a plurality of pieces of outline data 31 corresponding to a plurality of predetermined states of subject 100.

Each piece of outline data 31 is data on an outline of subject 100 indicating a state of subject 100. The details of outline data 31 will be described later with reference to FIG. 4.

Output device 40 outputs information associated with a state of subject 100. Output device 40 includes, for example, at least one of speaker 41, lighting fixture 42, and mobile terminal 43. Speaker 41 outputs a sound associated, with the state of subject 100, as the information associated with the state of subject 100. Lighting fixture 42 outputs light having light characteristics associated with the state of subject 100, as the information associated with the state of subject 100. Mobile terminal 43 includes a display and outputs a moving image associated with the state of subject 100, as the information associated with the state of subject 100. Mobile terminal 43 is, for example, a mobile device such as a smartphone or a tablet personal computer (PC). Mobile terminal 43 predetermines one or more specific pieces of outline data 31 from among the plurality of pieces of outline data 31. The one or more pieces of outline data 31 predetermined by mobile terminal 43 will be described later with reference to FIG. 6.

Controller 50 controls infrared light source 10, camera 20, memory 30, and output device 40. Controller 50 controls, for example, the time when infrared light source 10 emits the plurality of infrared rays in a spatially-dispersed manner, and the time when camera 20 captures subject 100.

Controller 50 makes a comparison between the outline of subject 100 captured by camera 20 and the plurality of pieces of outline data 31 stored in memory 30. Next, from among the plurality of pieces of outline data 31, controller 50 selects a piece of outline data 31 which resembles the outline of subject 100 captured by camera 20. Controller 50 then causes output device 40 to output information associated with a state of subject 100 corresponding to the selected piece of outline data 31. Furthermore, controller 50 determines whether or not the selected piece of outline data 31 matches a piece of outline data 31 predetermined from among the plurality of pieces of outline data 31. In the case of determining that the selected piece of outline data 31 matches the predetermined piece of outline data 31, controller 50 causes output device 40 to output information indicating that the actual state of subject 100 matches the state of subject 100 corresponding to the predetermined piece of outline data 31, as the information associated with the state of subject 100 corresponding to the selected piece of outline data 31. In the case of determining that the selected piece of outline data 31 does not match the predetermined piece of outline data 31, controller 50 causes output device 40 to output information indicating that the actual state of subject 100 does not match the state of subject 100 corresponding to the predetermined piece of outline data. 31, as the information associated with the state of subject 100 corresponding to the selected piece of outline data 31. Controller 50 may include, for example, a central processing unit (CPU) or other programmable microcontroller circuit. The memory 30 stores a program or code which, when executed by the CPU or microcontroller circuit, causes the controller to carry out the various functions described in detail herein.

Next, subject; 100 captured by camera 20 will be described.

FIG. 2 and FIG. 3 each illustrate an example of subject 100 captured by camera 20 according to Embodiment 1. More specifically, FIG. 2 illustrates an example of subject 100 captured in front profile by camera 20 in the case where infrared light source 10 and camera 20 are mounted on a wall. FIG. 3 illustrates an example of subject 100 captured in top profile by camera 20 in the case where infrared light source 10 and camera 20 are mounted on a ceiling.

FIG. 2 illustrates a person who has reflected some of the plurality of infrared rays emitted by infrared light source 10 mounted on the wall and who is rendered with multiple dots. This person is in a state of raising a hand. In FIG. 2, infrared light source 10 and camera 20 are mounted on the wall, and thus the state of the person, such as raising or lowering a hand, is easy to see. As described, camera 20 mounted on the wall captures subject 100 rendered with the multiple dots using the plurality of infrared rays emitted by infrared light source 10 mounted on the wall. Thus, the detailed body shape, expression, facial details, or the like, of subject 100 (for example, a person) are not shown clearly.

FIG. 3 illustrates a person who has reflected some of the plurality of infrared rays emitted by infrared light source 10 mounted on the ceiling and who is rendered with multiple dots. This person is in a state of raising a hand. In FIG. 3, infrared light source 10 is mounted on the ceiling, and thus the state of the person, such as raising or lowering a hand, is not easy to see in, for example, a two-dimensional view. However, the size of the multiple dots rendering the respective parts of the person's body differs depending on the distance between infrared light source 10 and the parts of the person's body. For example, as illustrated in FIG. 3, a hand located closer to infrared light source 10 mounted on the ceiling is rendered with larger dots, whereas the shoulders located farther from infrared light source 10 mounted on the ceiling are rendered with smaller dots. In other words, the size of the multiple dots rendering the respective parts of the person's body increases with the decreasing distance to infrared light source 10, and decreases with the increasing distance to infrared light source 10, for example. However, the relationship between the size of the dots and the distance to infrared light source 10 may differ depending on factors such as the lens structure and whether the light source is a laser or a light-emitting diode (LED). There are cases where the size of the dots decreases with the decreasing distance to infrared light source 10, and increases with the increasing distance to infrared light source 10.

As described, camera 20 mounted on the ceiling captures subject 100 which is rendered with multiple dots the size of which differs depending on the distance between infrared light source 10 and subject 100, using the plurality of infrared rays emitted by infrared light source 10 mounted on the ceiling. Thus, the detailed body shape, expression, or the like, of subject 100 are not shown clearly.

The data on subject 100 captured by camera 20 is data which merely shows subject 100 rendered with the multiple dots, and thus the data size is small.

Next, the following describes the plurality of pieces of outline data 31 that are stored in memory 30 and correspond to the plurality of predetermined states of subject 100.

Figure 4:
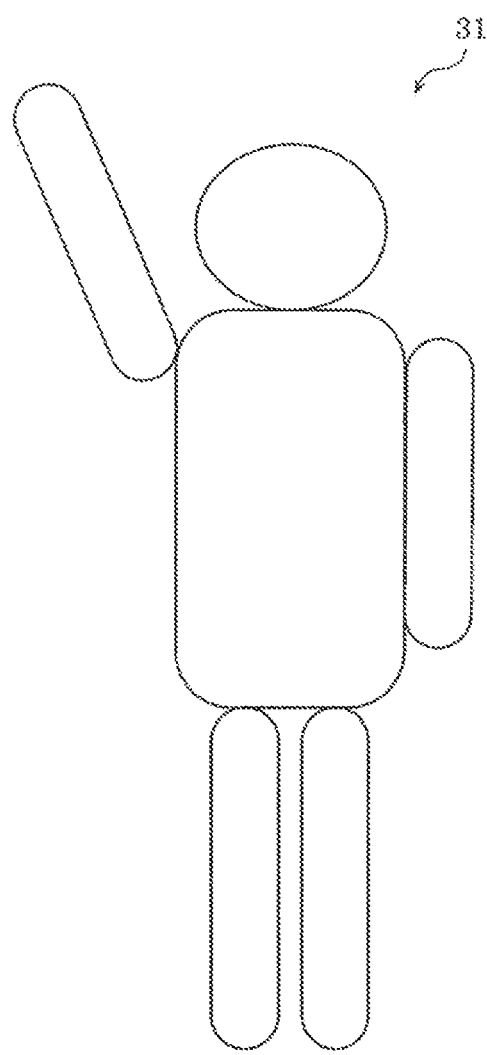
FIG. 4 illustrates an example of a piece of outline data according to Embodiment 1.

FIG. 4 illustrates an example of a piece of outline data 31 according to Embodiment 1. Each piece of outline data 31 is contour data indicating, for example, a state in which a person is raising a hand, a state in which a person is collapsing, a state in which no person is present, or a state in which a person is present. More specifically, FIG. 4 illustrates a contour indicating a state in which a person is raising a hand. The piece of outline data 31 illustrated in FIG. 4 is a mere example, and various pieces of outline data 31 indicating, for example, a state in which a person is collapsing and a state in which a person is present, are stored in memory 30. Although FIG. 4 illustrates an example of a piece of outline data 31 in the case where infrared light source 10 and camera 20 are mounted on the wall, outline data 31 is not limited to this. For example, in the case where infrared light source 10 and camera 20 are mounted on the ceiling, each piece of outline data 31 may be data having information that differs depending on the parts of a person's body indicated by the piece of outline data 31. For example, in the case of a piece of outline data 31 indicating a state in which a person is raising a hand, the parts of the person's body indicated in the data may be shown in the following manner. The hand may be shown with large dots, the head may be shown with dots smaller than the dots showing the hand, and the shoulders may be shown with dots smaller than the dots showing the head. (See, e.g., FIG. 3). This makes it possible to see that this piece of outline data 31 is a piece of data indicating a state in which a person is raising a hand. As described, each piece of outline data 31 may be not only two-dimensional contour data, but also data having information that differs depending on the parts of a person's body.

[Operation]

Next, the operation of motion detection system 1 illustrated in FIG. 1 will be described.

Figure 5:
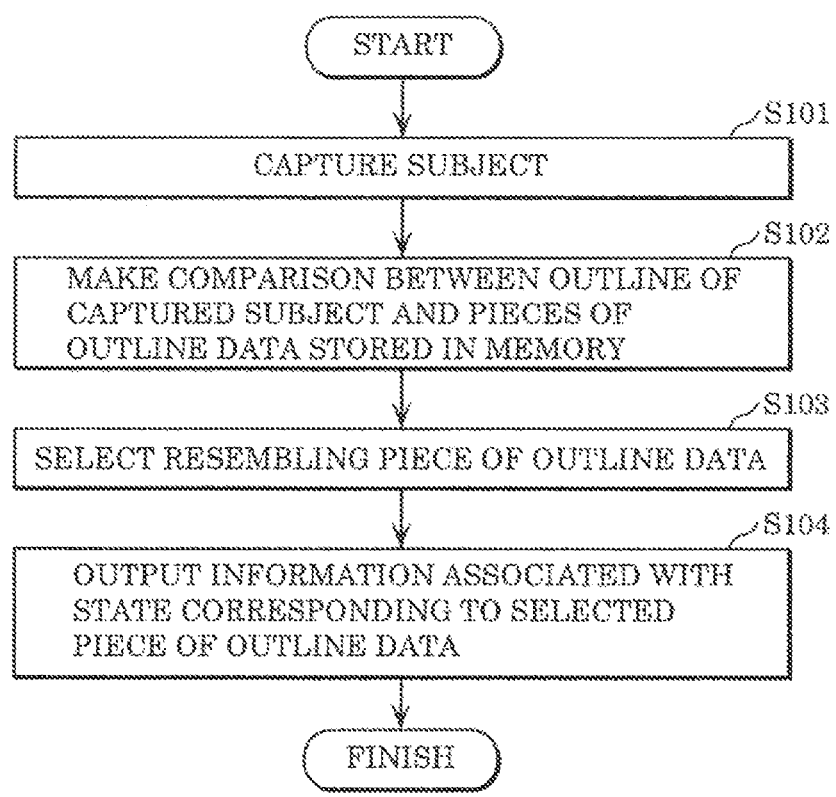
FIG. 5 is a flow chart illustrating an example of the operation of a motion detection system according to Embodiment 1.

FIG. 5 is a flow chart illustrating an example of the operation of motion detection system 1 according to Embodiment 1.

First, camera 20 captures subject 100 (S101). Here, camera 20 captures subject 100 which has reflected some of the plurality of infrared rays emitted by infrared light source 10 and is rendered with multiple dots. For example, camera 20 captures subject 100 as illustrated in FIG. 2. The data on subject 100 captured by camera 20 is stored in memory 30, for example.

Next, controller 50 makes a comparison between the outline of subject 100 captured by camera 20 and rendered with multiple dots and the plurality of pieces of outline data 31 stored in memory 30 in advance (S102). The comparison between the outline of subject 100 captured by camera 20 and the plurality of pieces of outline data 31 is performed by, for example, matching the feature points of the respective data. More specifically, the comparison between the outline of subject 100 captured by camera 20 and the plurality of pieces of outline data 31 is performed based on, for example, a difference in the contour or a difference in the size of the multiple dots used for rendering subject 100.

Then, from among the plurality of pieces of outline data 31, controller 50 selects a piece of outline data 31 which resembles the outline of subject 100 captured by camera 20 (S103). For example, in the case where the piece of outline data 31 which resembles the outline of subject 100 illustrated in FIG. 2 is one of the plurality of pieces of outline data 31 which is illustrated in FIG. 4, controller 50 selects the piece of outline data 31 illustrated in FIG. 4.

Lastly, controller 50 causes output device 40 (at least one of speaker 41, lighting fixture 42, and mobile terminal 43) to output information associated with a state of subject 100 corresponding to the selected piece of outline data 31 (S104). Speaker 41 outputs a sound associated with the state of subject 100, as the information associated with the state of subject 100. Lighting fixture 42 outputs light having light characteristics associated with the state of subject 100, as the information associated with the state of subject 100. Mobile terminal 43 outputs a moving image associated with the state of subject 100, as the information associated with the state of subject 100.

More specifically, the following operation is performed from Step S101 to S104.

Controller 50 determines the state of subject 100 by making a comparison between the outline of subject 100 captured by camera 20 and the plurality of pieces of outline data 31 stored in memory 30. For example, controller 50 determines that the state of subject 100 is a state in which a person is present, a state in which no person is present, a state in which a person is standing, a state in which a person is sitting, or a state in which a person is collapsing (It is necessary to store in memory 30 pieces of outline data 31 indicating these states, in advance). Then, based on the determination result, controller 50 causes output device 40 to output information associated with the determined state. For example, when controller 50 determines that the state of subject 100 is a state in which a person is collapsing, speaker 41 outputs, for example, a warning sound (e.g., a beep or a voice) as the information associated with the state of subject 100. Lighting fixture 42 outputs, for example, light indicating a critical state, such as light having a low color temperature (close to red), bright light, or flashing light, as the information associated with the state of subject 100. Mobile terminal 43 outputs, for example, characters or an image indicating that a person is collapsing or the place where the person is collapsing, on a display or the like included in mobile terminal 43. As described, by outputting the information associated with the state in which a person is collapsing, output device 40 can notify, for example, a monitoring person that a person is collapsing. Note that output device 40 may output the information associated with the state of subject 100 not only to a monitoring person but also to subject 100, for example.

Furthermore, controller 50 determines whether or not the selected piece of outline data 31 matches a piece of outline data 31 predetermined from among the plurality of pieces of outline data 31. Controller 50 determines whether or not the selected piece of outline data 31 matches, as the predetermined piece of outline data 31, a piece of outline data 31 indicating a state in which a person is raising a hand, or a piece of outline data 31 indicating a state in which three people are present at a predetermined position, for example. In the present embodiment, the predetermined piece of outline data 31 is a piece of outline data 31 predetermined by mobile terminal 43, for example.

In the case of determining that the selected piece of outline data 31 matches the predetermined piece of outline data 31, controller 50 causes output device 40 to output, as the information associated with the state of subject 100 corresponding to the selected piece of outline data 31, information indicating that the actual state of subject 100 matches the state of subject 100 corresponding to the predetermined piece of outline data 31. In the case of determining that the selected piece of outline data 31 does not match the predetermined piece of outline data 31, controller 50 causes output device 40 to output, as the information associated with the state of subject 100 corresponding to the selected piece of outline data 31, information indicating that the actual state of subject 100 does not match the state of subject 100 corresponding to the predetermined piece of outline data 31.

As described, the state of subject 100 is detected by capturing subject 100 rendered with multiple dots and by making a comparison between the outline of captured subject 100 and the pieces of outline data 31 stored in advance. Then, the information associated with the state of subject 100 is output from output device 40.

Next, the following describes some examples of specific applications of motion detection system 1 according to the present embodiment.

[Movement Game]

Motion detection system 1 according to the present embodiment is applicable to a movement game, for example. The movement game is a game where, in a place such as a care facility, lighting fixtures 42 located at four different positions are turned on at random and it is determined whether a care receiver was able to move to a position corresponding to lighting fixture 42 which is turned on. Note that the number of positions at which lighting fixtures 42 are located may be two, three, five, or greater.

First, for example, a care giver who cares for the care receiver operates mobile terminal 43, so that mobile terminal 43 predetermines specific pieces of outline data 31 from among the plurality of pieces of outline data 31.

Figure 6:
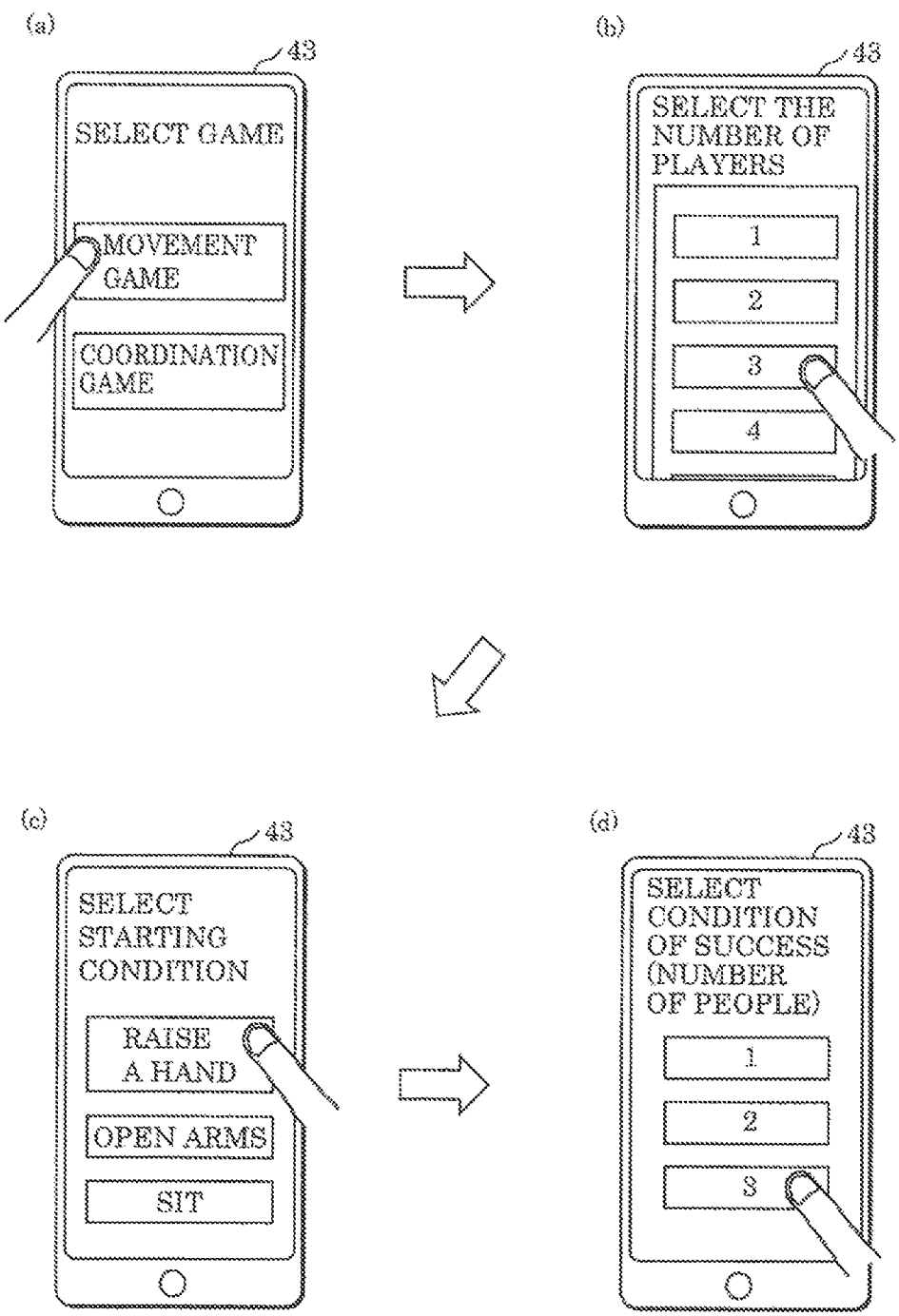
FIG. 6 illustrates how a mobile terminal according to Embodiment 1 predetermines specific pieces of outline data.

FIG. 6 illustrates how mobile terminal 43 according to Embodiment 1 predetermines specific pieces of outline data 31.

Part (a) of FIG. 6 illustrates how a game e played is selected. When predetermining specific pieces of outline data 31, mobile terminal 43 predetermines some pieces of outline data 31 from among candidate pieces of outline data 31 corresponding to the game selected, here. Here, the following describes how mobile terminal 43 predetermines specific pieces of outline data 31 when "movement game" is selected by user input to a touchscreen, for example.

Part (b) of FIG. 6 illustrates how the number of people who are to play the movement game is predetermined. Here, "3" is specified by user input to a touch screen, for example. That is to say, mobile terminal 43 predetermines a piece of outline data 31 indicating a state in which three people are present in the capturing range of camera 20. Mobile terminal 43 communicates this information to the controller 50 via a wireless line (e.g., Bluetooth, infrared, etc.) With this, controller 50 determines whether or not a piece of outline data 31 selected by controller 50 as resembling the outline of subject 100 captured by camera 20 is the piece of outline data 31 indicating a state in which three people are present in the capturing range of camera 20. Note that the number of people to be specified may be one, two, four, or greater.

Next, part (c) of FIG. 6 illustrates how a condition for starting the movement game is predetermined. Here, "Raise a hand" is specified by user input to a touchscreen as an example. That is to say, mobile terminal 43 predetermines a piece of outline data 31 indicating a state in which a person is raising a hand and communicates the information to controller 50. With this, controller 50 determines whether or not a piece of outline data 31 selected by controller 50 as resembling the outline of subject 100 captured by camera 20 is the piece of outline data 31 indicating a state in which a person is raising a hand. Note that the condition for starting the movement game may be, for example, a state in which a person is opening his/her arms or a state in which a person is sitting.

Next, part (d) of FIG. 6 illustrates how a condition of success of the movement game is predetermined. Here, "3" is specified by user input, for example. That is to say, mobile terminal 43 predetermines a piece of outline data 31 indicating a state in which three people are present at a predetermined position (position corresponding to lighting fixture 42 which is turned on). Such information is communicated to controller 50 and with this, controller 50 determines whether or not a piece of outline data 31 selected by controller 50 as resembling the outline of subject 100 captured by camera 20 is the piece of outline data 31 indicating a state in which three people are present at a predetermined position. Note that the number of people to be specified may be one, two, four, or greater, as long as it is less than or equal to the number of people playing the movement game.

Next, the detailed operation of the movement game will be described.

Figure 7:
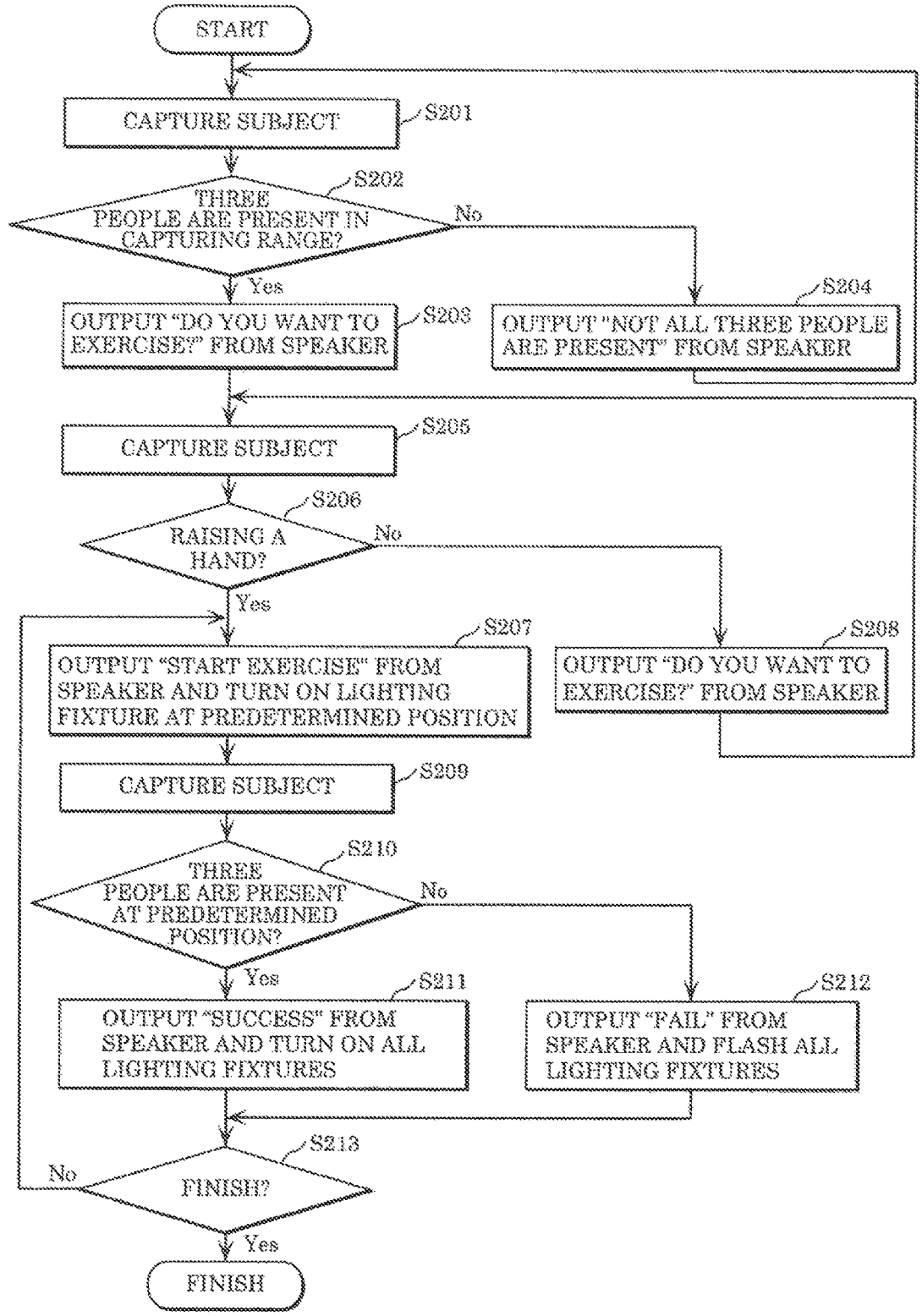
FIG. 7 is a flow chart illustrating the operation of a movement game to which a motion detection system according to Embodiment 1 is applied.

FIG. 7 is a flow chart illustrating the operation of the movement game to which motion detection system 1 according to Embodiment 1 is applied. FIG. 7 illustrates the operation performed after, for example, a care giver has predetermined the pieces of outline data 31 illustrated in FIG. 6 using mobile terminal 43.

First, camera 20 captures subject 100 (S201). More specifically, camera 20 captures subject 100 which has reflected some of the plurality of infrared rays emitted, by infrared, light source 10 and is rendered with multiple dots.

Controller 50 determines whether or not the state of subject 100 is the state indicated by one of the predetermined pieces of outline data 31, that is, for example, the state in which three people are present in the capturing range of camera 20 (S202). More specifically, the following operation is performed.

Controller 50 makes a comparison between the outline of subject 100 captured by camera 20 and rendered with multiple dots and the plurality of pieces of outline data 31 stored in memory 30. Then, from among the plurality of pieces of outline data 31, controller 50 selects a piece of outline data 31 which resembles the outline of subject 100 captured by camera 20. Furthermore, controller 50 determines whether or not the selected piece of outline data 31 matches the predetermined piece of outline data 31 indicating the state in which three people are present in the capturing range of camera 20.

In the case of determining that the state of subject 100 is not the state in which three people are present in the capturing range of camera 20 (No in S202), controller 50 causes output device 40 to output information indicating that the state of subject 100 is not the state in which three people are present in the capturing range of camera 20 (S204). Here, controller 50 causes speaker 41 to output "not all three people are present", for example, as the information indicating that the state of subject 100 is not the state in which three people are present in the capturing range of camera 20. Then, the determination in Step S202 is performed again.

In the case of determining that the state of subject 100 is the state in which three people are present in the capturing range of camera 20 (Yes in S202), controller 50 causes output device 40 to output information indicating that the state of subject 100 is the state in which three people are present in the capturing range of camera 20 (S203). Here, controller 50 causes speaker 41 to output "Do you want to exercise?" for example, as the information indicating that the state of subject 100 is the state in which three people are present in the capturing range of camera 20.

Next, camera 20 captures subject 100 (S205). Note that the operation in Step S205 is the same as Step S201, and thus the detailed description of Step S205 is omitted.

Controller 50 determines whether or not the state of subject 100 is the state indicated by one of the predetermined pieces of outline data 31, that is, the state in which a person is raising a hand (S206). Note that the operation in Step S206 is the same as Step S202 except that the predetermined piece of outline data 31 is the piece of outline data 31 indicating the state in which a person is raising a hand. Thus, the detailed description of Step S206 is omitted.

In the case of determining that the state of subject 100 is not the state in which a person is raising a hand (No in S206), controller 50 causes output device 40 to output information indicating that the state of subject 100 is not the state in which a person is raising a hand (S208). Here, controller 50 causes speaker 41 to output "Do you want to exercise?" for example, as the information indicating that the state of subject 100 is not the state in which a person is raising a hand. Then, the operation in Step S205 is performed again.

In the case of determining that the state of subject 100 is the state in which a person is raising a hand (Yes in S206), controller 50 causes output device 40 to output information indicating that the state of subject 100 is the state in which a person is raising a hand (S207). Here, controller 50 causes speaker 41 to output "Start exercise", for example, as the information indicating that the state of subject 100 is the state in which a person is raising a hand. Furthermore, controller 50 turns on a random one of lighting fixtures 42 located at four different positions, for example, as the information indicating that the state of subject 100 is the state in which a person is raising a hand.

Next, camera 20 captures subject 100 (S209). Note that the operation in Step S209 is the same as Step S201, and thus the detailed description of Step S209 is omitted.

Controller 50 determines whether or not the state of subject 100 is the state indicated by one of the predetermined pieces of outline data 31, that is, the state in which three people are present at the predetermined position (position corresponding to lighting fixture 42 which is turned on) (S210). Note that the operation in Step S210 is the same as Step S202 except that the predetermined piece of outline data 31 is the piece of outline data 31 indicating the state in which three people are present at the predetermined position. Thus, the detailed description of Step S210 is omitted.

In the case of determining that the state of subject 100 is the state in which three people are present at the predetermined position (Yes in S210), controller 50 causes output device 40 to output information indicating that the state of subject 100 is the state in which three people are present at the predetermined position (S211). Here, controller 50 causes speaker 41 to output "Success", for example, as the information indicating that the state of subject 100 is the state in which three people are present at the predetermined position. Furthermore, controller 50 turns on all lighting fixtures 42, for example, as the information indicating that the state of subject 100 is the state in which three people are present at the predetermined position.

In the case of determining that the state of subject 100 is not the state in which three people are present at the predetermined position (No in S210), controller 50 causes output device 40 to output information indicating that the state of subject 100 is not the state in which three people are present at the predetermined position (S212). Here, controller 50 causes speaker 41 to output "Fail", for example, as the information indicating that the state of subject 100 is not the state in which three people are present at the predetermined position. Furthermore, controller 50 flashes all lighting fixtures 42, for example, as the information indicating that the state of subject 100 is not the state in which three people are present at the predetermined position.

Next, controller 50 determines whether or not to finish the movement game (S213). For example, controller 50 determines whether or not a signal for finishing the movement game has been received from mobile terminal 43 operated by the care giver. Moreover, for example, mobile terminal 43 may predetermine a piece of outline data 31 indicating a state to finish the movement game as illustrated in FIG. 6, and controller 50 may determine whether or not the state of subject 100 is the state to finish the movement game.

In the case where controller 50 determines to finish the movement game (Yes in S213), the movement game is finished.

In the case where controller 50 does not determine to finish the movement game (No in S213), the operations in Step S207 and subsequent steps are performed again. That is to say, in Step S207, speaker 41 outputs "Start exercise" and a random one of lighting fixtures 42 located at four different positions is turned on.

As described, motion detection system 1 is applicable not only for the purpose of monitoring whether or not a person is collapsing, but also for the purpose of encouraging care receivers and so on to do some exercise or do such activities as rehabilitation in an enjoyable manner, for example.

[Coordination Game]

Motion detection system 1 according to the present embodiment is further applicable to a coordination game, for example. The coordination game is a dance game, for example, and is a game of determining whether or not students taking a dance lesson are coordinating their movements with the trainer's movements, that is, whether or not the students are making the same movements as the trainer's movements.

First, the trainer operates mobile terminal 43, for example, so that mobile terminal 43 predetermines specific pieces of outline data 31 from among the plurality of pieces of outline data 31 as illustrated in FIG. 6.

Next, the detailed operation of the coordination game will be described.

Figure 8:
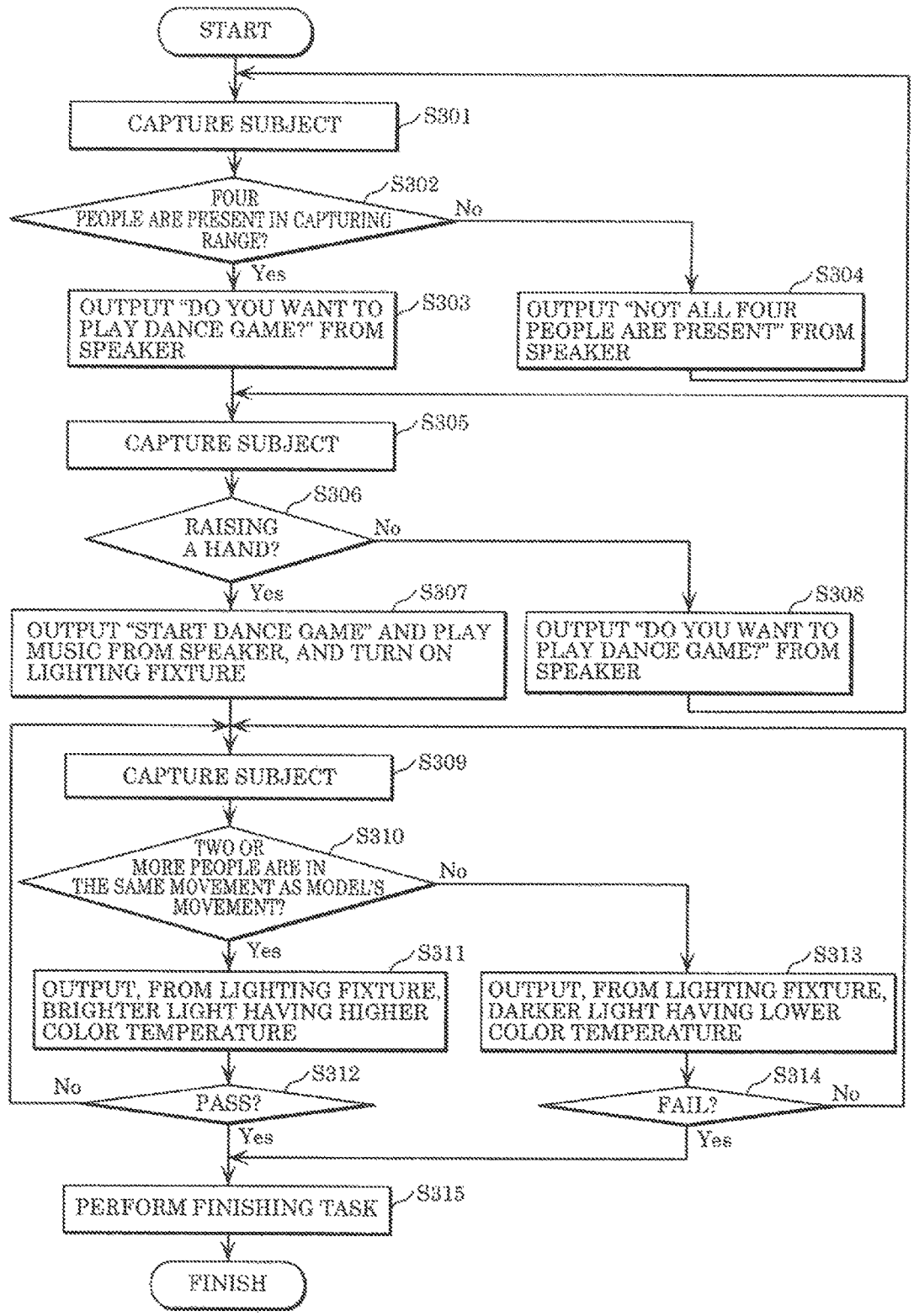
FIG. 8 is a flow chart illustrating the operation of a coordination game to which a motion detection system according to Embodiment 1 is applied.

FIG. 8 is a flow chart illustrating the operation of the coordination game to which motion detection system 1 according to Embodiment 1 is applied.

First, camera 20 captures subject 100 (S301). More specifically, camera 20 captures subject 100 which has reflected some of the plurality of infrared rays emitted by infrared light source 10 and is rendered with multiple dots.

Controller 50 determines whether or not the state of subject 100 is the state indicated by one of the predetermined pieces of outline data 31, that is, a state in which four people are present in the capturing range of camera 20 (S302). More specifically, the following operation is performed.

Controller 50 makes a comparison between the outline of subject 100 captured by camera 20 and rendered with multiple dots and the plurality of pieces of outline data 31 stored in memory 30. Then, from among the plurality of pieces of outline data 31, controller 50 selects a piece of outline data 31 which resembles the outline of subject. 100 captured by camera 20. Furthermore, controller 50 determines whether or not the selected piece of outline data 31 is the predetermined piece of outline data 31 indicating the state in which four people are present in the capturing range of camera 20. Note that the piece of outline data 31 predetermined by mobile terminal 43 may be a piece of outline data 31 indicating a state in which the number of people present in the capturing range of camera 20 is three or less, or five or greater.

In the case of determining that the state of subject 100 is not the state in which four people are present in the capturing range of camera 20 (No in S302), controller 50 causes output device 40 to output information indicating that the state of subject 100 is not the state in which four people are present in the capturing range of camera 20 (S304). Here, controller 50 causes speaker 41 to output "not all four people are present", for example, as the information indicating that the state of subject 100 is not the state in which four people are present in the capturing range of camera 20. Then, the determination in Step S302 is performed again.

In the case of determining that the state of subject 100 is the state in which four people are present in the capturing range of camera 20 (Yes in S302), controller 50 causes output device 40 to output information indicating that the state of subject 100 is the state in which four people are present in the capturing range of camera 20 (S303). Here, controller 50 causes speaker 41 to output "Do you want to play dance game?" for example, as the information indicating that the state of subject 100 is the state in which four people are present in the capturing range of camera 20.

Next, camera 20 captures subject 100 (S305). Note that the operation in Step S305 is the same as Step S301, and thus the detailed description of Step S305 is omitted.

Controller 50 determines whether or not the state of subject 100 is the state indicated by one of the predetermined pieces of outline data 31, that is, a state in which a person is raising a hand (S306). Note that the operation in Step S306 is the same as Step S302 except that the predetermined piece of outline data 31 is the piece of outline data 31 indicating the state in which a person is raising a hand. Thus, the detailed description of Step S306 is omitted. Note also that the piece of outline data 31 predetermined by mobile terminal 43 may be a piece of outline data 31 indicating, for example, a state in which a person is opening his/her arms or a state in which a person is sitting.

In the case of determining that the state of subject 100 is not the state in which a person is raising a hand (No in S306), controller 50 causes output device 40 to output information indicating that the state of subject 100 is not the state in which a person is raising a hand (S308). Here, controller 50 causes speaker 41 to output "Do you want to play dance game?" for example, as the information indicating that the state of subject 100 is not the state in which a person is raising a hand. Then, the operation in Step S305 is performed again.

In the case of determining that the state of subject 100 is the state in which a person is raising a hand (Yes in S306), controller 50 causes output device 40 to output information indicating that the state of subject 100 is the state in which a person is raising a hand (S307). Here, controller 50 causes speaker 41 to output "Start dance game" and music for the dance, for example, as the information indicating that the state of subject 100 is the state in which a person is raising a hand. Furthermore, controller 50 turns on lighting fixture 42, for example, as the information indicating that the state of subject 100 is the state in which a person is raising a hand.

Next, camera 20 captures subject 100 (S309). Note that the operation in Step S309 is the same as Step S301, and thus the detailed description of Step S309 is omitted.

Next, controller 50 determines whether or not the state of subject 100 is a state indicated by one of the predetermined pieces of outline data 31, that is, a state in which two or more of the four people are in the same movement as the model's movement (that is, the movement of the trainer dancing as a model) (S310). More specifically, controller 50 determines at a predetermined time whether or not the outline of subject 100 resembles the predetermined piece of outline data 31. Note that the operation Step S310 is the same as Step S302 except that the predetermined piece of outline data 31 is the piece of outline data 31 indicating the state in which two or more of the four people are in the same movement as the model's movement. Thus, the detailed description of Step S310 is omitted. Note also that the piece of outline data 31 predetermined by mobile terminal 43 may be, for example, a piece of outline data 31 indicating a state in which one or more of the four people or three or more of the four people are in the same movement as the model's movement.

In the case of determining that the state of subject 100 is the state in which two or more of the four people are in the same movement as the model's movement (Yes in S310), controller 50 causes output device 40 to output information indicating that the state of subject 100 is the state in which two or more of the four people are in the same movement as the model's movement (S311). Here, controller 50 causes lighting fixture 42 to output brighter light having a higher color temperature, for example, as the information indicating that the state of subject 100 is the state in which two or more of the four people are in the same movement as the model's movement. Furthermore, controller 50 increments a predetermined variable (not illustrated) stored in memory 30, for example.

Next, controller 50 determines whether or not the students' dance level is a passing level (S312). More specifically, controller 50 determines whether or not the predetermined variable stored in memory 30 is greater than or equal to a threshold representing a pass.

In the case of determining that the students' dance level is not the passing level (No in S312), the operations in Step S309 and subsequent steps are performed again.

On the other hand, in the case of determining at the state of subject 100 is not the state in which two or more of the four people are in the same movement as the model's movement (No in S310), controller 50 causes output device 40 to output information indicating that the state of subject 100 is not the state in which two or more of the four people are in the same movement as the model's movement (S313). Here, controller 50 causes lighting fixture 42 to output darker light having a lower color temperature, for example, as the information indicating that the state of subject 100 is not the state in which two or more of the four people are in the same movement as the model's movement. Furthermore, controller 50 decrements the predetermined variable stored in memory 30, for example.

Next, controller 50 determines whether or not the students' dance level is a failing level (S314). More specifically, controller 50 determines whether or not the predetermined variable stored in memory 30 is less than or equal to a threshold representing a fail.

In the case of determining that the students' dance level is not the failing level (No in S314), the operations in Step S309 and subsequent steps are performed again.

As described, by repeating the operations from Step S309 to S314, the greater the number of times the students (here, two or more of the four students) make the same movement as the trainer's movement, the brighter and the closer to blue the light from lighting fixture 42 becomes. On the other hand, the greater the number of times the students make a different movement from the trainer's movement, the darker and the closer to red the light from lighting fixture 42 becomes. This allows the students to know whether or not they are dancing correctly, based on the characteristics of the light output from lighting fixture 42.

In the case of determining that the students' dance level is the passing level or the failing level (Yes in S312 or S314), controller 50 performs a finishing task (S315). More specifically, in the case of determining that the students' dance level is the passing level, controller 50 causes speaker 41 to output a fanfare, for example. On the other hand, in the case of determining that the students' dance level is the failing level, controller 50 causes speaker 41 to output a beep, for example. Then, the dance game is finished.

As described, motion detection system 1 is applicable not only for the purpose of a care receiver's exercise, rehabilitation, or the like, but also for the dance lessons, for example.

[Advantageous Effects]

In the case of using the motion detection system for purposes other than security, it is unnecessary to clearly show the detailed body shape, expression, or the like, of a person. For example, in the case of using the motion detection system for detecting the state of a person, such as collapsing or raising a hand, in a place such as a hospital, a care facility, or a toilet, the motion detection system needs to be privacy-conscious.

In view of the foregoing, motion detection system 1 according to the present embodiment is a motion detection system that detects subject 100, and includes: infrared light source 10 that emits a plurality of infrared, rays in a spatially-dispersed manner; and camera 20 that captures subject 100 using, among the plurality of infrared rays emitted by infrared light source 10, infrared rays reflected by subject 100. Motion detection system 1 further includes: memory 30 that stores a plurality of pieces of outline data 31 corresponding to a plurality of predetermined states of subject 100; and output device 40 that outputs information associated with a state of subject 100. Motion detection system 1 further includes controller 50 that controls infrared light source 10, camera 20, memory 30, and output device 40. Controller 50 makes a comparison between an outline of subject 100 captured by camera 20 and the plurality of pieces of outline data 31 stored in memory 30. Controller 50 then selects, from among the plurality of pieces of outline data 31, a piece of outline data 31 which resembles the outline of subject 100 captured by camera 20, and causes output device 40 to output information associated with a state of subject 100 corresponding to the selected piece of outline data 31.

With this, subject 100 captured by camera 20 reflects some of the plurality of infrared rays emitted in a spatially-dispersed manner by infrared light source 10, this reflection of the infrared rays makes the outline of subject 100 rendered with dots. Furthermore, output device 40 outputs, rather than the shape of subject 100 rendered with dots, information (for example, characters, sound, or light) corresponding to a piece of outline data 31 which is stored in memory 30 and resembles the outline of subject 100 rendered with dots. Thus, it is possible to detect the state of subject 100 while being privacy-conscious. The data on subject 100 captured by camera 20 is data which merely shows subject 100 rendered with multiple dots, and is thus small in the data size and is easy to handle.

Furthermore, controller 50 determines whether or not the selected piece of outline data 31 matches a piece of outline data 31 predetermined, from among the plurality of pieces of outline data 31. In the case of determining that the selected piece of outline data 31 matches the predetermined piece of outline data 31, controller 50 causes output device 40 to output information indicating that the actual state of subject 100 matches the state of subject 100 corresponding to the predetermined piece of outline data 31, as the information associated with the state of subject 100 corresponding to the selected piece of outline data 31.

In the case of determining that the selected piece of outline data 31 does not match the predetermined piece of outline data 31, controller 50 causes output device 40 to output information indicating that the actual state of subject 100 does not match the state of subject 100 corresponding to the predetermined piece of outline data 31, as the information associated with the state of subject 100 corresponding to the selected piece of outline data 31.

This makes it possible to output predetermined information when the state of subject 100 matches a predetermined state. For example, it is possible to cause output device 40 to output information for starting a game, using a state of a person raising a hand as a sign of starting the game. Furthermore, for example, it is also possible to cause output device 40 to output information for finishing a game, using a state of a person raising both hands as a sign of finishing the game. As described, the state of subject 100 is detected based on the outline of subject 100 rendered with multiple dots and a piece of outline data 31. Then, using the detected state of subject 100 as a trigger, output device 40 can output information associated with the state of subject 100.

Output device 40 includes mobile terminal 43 which outputs, as the information, a moving image associated with the state of subject 100.

With this, a display or the like included in mobile terminal 43 can output, for example, an image, a moving image, or characters representing the state of subject 100. This make it possible to output information indicating the state of subject 100 while being privacy-conscious, using, for example, the image, the moving image, or the characters associated with the state of subject 100.

Furthermore, output device 40 includes speaker 41 which outputs, as the information, a sound associated with the state of subject 100.

With this, speaker 41 can output a sound indicating the state of subject 100. This makes it possible to output information indicating the state of subject 100 while being privacy-conscious, using the sound indicating the state of subject 100.

Output device 40 includes lighting fixture 42 which outputs, as the information, light having light characteristics associated with the state of subject 100.

With this, lighting fixture 42 can output light having light characteristics indicating the state of subject 100. This makes it possible to output information indicating the state of subject 100 while being privacy-conscious, using light having characteristics, such as an intensity or a color temperature, which are varied according to the state of subject 100.

[Embodiment 2]

Hereinafter, Embodiment 2 will be described with reference to FIG. 9 to FIG. 11.

[Structure]

Motion detection system 1a according to the present embodiment further includes wearing unit 70 which is to be worn on the body of subject 100 and reflects some of the plurality of infrared rays emitted in a spatially-dispersed manner by infrared light source 10. Wearing unit 70 includes infrared absorbing unit 71 and infrared reflecting unit 72. These are the differences from motion detection system 1 according to Embodiment 1. The other structural elements are the same as the structural elements of motion detection system 1 according to Embodiment 1, and thus the descriptions of the other structural elements are omitted.

With motion detection system 1 according to Embodiment 1, camera 20 captures subject 100 using, among the plurality of infrared rays emitted by infrared light source 10, infrared rays reflected by subject 100. The infrared reflectance sometimes decreases depending on a person's skin color, or the material or color of the clothes the person is wearing, for example. This could make it difficult for camera 20 to capture the outline of subject 100 using the infrared rays reflected by subject 100. With motion detection system 1a according to the present embodiment, camera 20 captures subject 100 using the infrared rays reflected by subject 100 and wearing unit 70.

Figure 9:
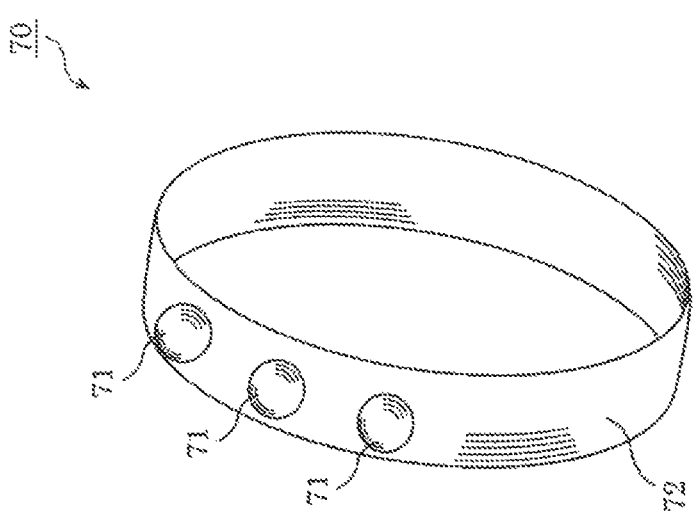
FIG. 9 is a perspective, external view of a wearing unit according to Embodiment 2.

FIG. 9 is a perspective, external view of wearing unit 70 according to Embodiment 2.

As illustrated in FIG. 9, wearing unit 70 includes infrared absorbing units 71 and infrared reflecting unit 72. Wearing unit 70 includes three infrared absorbing units 71, for example, but the number of infrared absorbing units 71 is not limited to three. For example, the number of infrared absorbing units 71 included in wearing unit 70 may be one, two, four, or greater.

Infrared reflecting unit 72 has a ring shape and is worn on, for example, an arm of subject 100 (person) like a wrist watch. Infrared reflecting unit 72 contains a material which reflects infrared rays, and has an infrared reflectance of 90% or greater, for example.

Infrared absorbing units 71 have a spherical shape, and are attached to the outer circumferential surface of infrared reflecting unit 72, for example. The diameter of infrared absorbing units 71 is, for example, smaller than the width of infrared reflecting unit 72 that is perpendicular to the circumferential direction of infrared reflecting unit 72. Infrared absorbing units 71 contain a material which absorbs infrared rays, and have an infrared absorptance of 90% or greater, for example.

As described, since motion detection system 1a according to the present embodiment includes wearing unit 70 having infrared reflecting unit 72, the plurality of infrared rays emitted in a spatially-dispersed manner by infrared light source 10 can be more easily reflected by wearing unit 70. This allows camera 20 to more easily capture the part of subject 100 on which wearing unit 70 is worn. Furthermore, since wearing unit 70 includes infrared absorbing units 71 on a part of the outer circumferential surface of infrared reflecting unit 72, the reflection of the infrared rays emitted to wearing unit 70 is reduced by infrared absorbing units 71. Therefore, because wearing unit 70 partially has a characteristic region which reduces the reflection of the infrared rays, camera 20 can more easily recognize wearing unit 70.

Next, the following describes an example of a specific application of motion detection system 1a according to the present embodiment.

[Rehabilitation Game]

Motion detection system 1a according to the present embodiment is applicable to a rehabilitation game, for example. The rehabilitation game is, for example, a game for assisting in rehabilitation of the joint of an elbow or the like, in a place such as a hospital.

Figure 10:
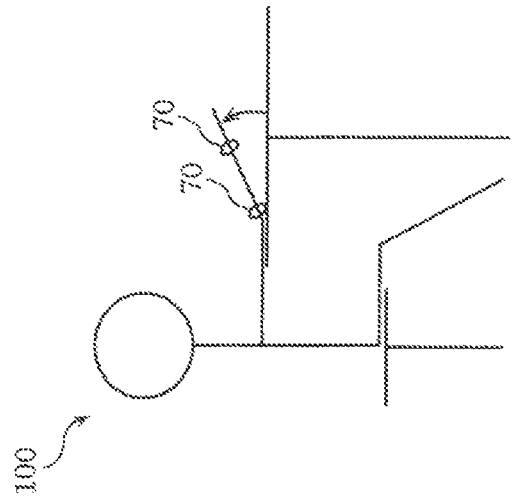
FIG. 10 illustrates how a subject plays rehabilitation game to which a motion detection system according to Embodiment 2 is applied.

FIG. 10 illustrates how subject 100 plays the rehabilitation game to which motion detection system 1a according to Embodiment 2 is applied. Infrared light source 10 and camera 20 are mounted on a wall or ceiling, for example. Infrared light source 10 emits a plurality of infrared rays in a spatially-dispersed manner toward subject 100 who is wearing wearing unit 70, and camera 20 captures subject 100 using infrared rays reflected by subject 100 and wearing unit 70. FIG. 10 illustrates how subject 100 (a person, in the present embodiment) who is wearing two wearing units 70 on his/her arm is rehabilitating the joint of his/her elbow on a desk. More specifically, subject 100 rehabilitates the joint of his/her elbow by bending his/her arm from a position parallel to the desk to a position perpendicular to the desk, with one of two wearing units 70 worn on the wrist side and the other on the elbow side. As described, because one of two wearing units 70 is worn on the wrist side and the other on the elbow side, camera 20 can capture subject 100 in various states in which the arm is bent at different angles, with two wearing units 70 serving as marks. Here, in the case of rehabilitating his/her right arm, subject 100 wears wearing unit 70 also on, for example, his/her left arm requiring no rehabilitation (that is, the arm that can be freely bent).

Next, a detailed operation of the rehabilitation game will be described.

FIG. 11 is a flow chart illustrating the operation of the rehabilitation game to which motion detection system 1a according to Embodiment 2 is applied.

First, camera 20 captures subject 100 (S401). More specifically, camera 20 captures subject 100 which has reflected some of the plurality of infrared rays emitted by infrared light source 10 and is rendered with multiple dots.

Controller 50 determines whether or not the state of subject 100 is a state indicated by one of predetermined pieces of outline data 31, that is, a state in which a person is present at a predetermined position (for example, a state in which a person is sitting in a chair beside the desk used for the elbow rehabilitation as illustrated in FIG. 10) (S402). More specifically, the following operation is performed.

Controller 50 makes a comparison between the outline of subject 100 captured by camera 20 and rendered with multiple dots and the plurality of pieces of outline data 31 stored in memory 30. Then, from among the plurality of pieces of outline data 31, controller 50 selects a piece of outline data 31 which resembles the outline of subject 100 captured by camera 20. Furthermore, controller 50 determines whether or not the selected piece of outline data 31 is the predetermined piece of outline data 31 indicating the state in which a person is present at a predetermined position.

In the case of determining that the state of subject 100 is not the state in which a person is present at a predetermined position (No in S402), controller 50 causes output device 40 to output information indicating that the state of subject 100 is not the state in which a person is present at a predetermined position. Note that controller 50 does not have to cause output device 40 to output information indicating that the state of subject 100 does not match the state of subject 100 corresponding to the predetermined piece of outline data 31. Here, nothing is output and the operation in Step S401 is performed again as illustrated in FIG. 11.

In the case of determining that the state of subject 100 is the state in which a person is present at a predetermined position (Yes in S402), controller 50 causes output device 40 to output information indicating that the state of subject 100 is the state in which a person is present at a predetermined position (S403). Here, controller 50 causes speaker 41 to output "Say something aloud", for example, as the information indicating that the state of subject 100 is the state in which a person is present at a predetermined position (not illustrated).

Next, it is determined whether or not subject 100 has played the rehabilitation game in the past (S403). For example, motion detection system 1*a* in according to the present embodiment includes a microphone arid a voice recognition unit (not illustrated). This allows, when subject 100 says something aloud, controller 50 to determine whether or not voice data of subject 100 is previously stored in memory 30, for example. In the case where the voice data of subject 100 is previously stored in memory 30, it is determined that subject 100 has played the rehabilitation game in the past. In the case where the voice data of subject 100 is not previously stored memory 30, it is determined that subject 100 has never played the rehabilitation game in the past.

In the case of determining that subject. 100 has played the rehabilitation game in the past (Yes in S403), controller 50 reads, as a piece of outline data 31 indicating a maximum value, a piece of outline data 31 stored in memory 30 and resembling the outline of subject 100 when subject 100 bent his/her arm to the maximum in the rehabilitation game played in the past (S404). That is to say, the piece of outline data 31 resembling the outline of subject 100 when subject 100 bent his/her arm to the maximum is predetermined as the piece of outline data 31 indicating the maximum value. Here, the plurality of pieces of outline data 31 stored in memory 30 include, for example, pieces of outline data 31 of subject 100 indicating states in which his/her arm is bent at every five degrees. In this case, a piece of outline data 31 indicating a state in which his/her arm is bent at 45 degrees is read as the piece of outline data 31 indicating the maximum value, for example.

In the case of determining that subject 100 has never played the rehabilitation game in the past (No in S403), the voice of subject 100 is obtained using the microphone and the voice data of subject 100 is stored in memory 30, to make personal registration of subject 100 (S405).

After Step S404 or Step S405, subject 100 bends, to a target angle of the right arm rehabilitation, his/her left arm wearing wearing unit 70 and requiring no rehabilitation. More specifically, subject 100 bends his/her freely-bendable left arm instead of the right arm requiring rehabilitation, to the target angle to which subject 100 aims to bend his/her right arm.

Next, camera 20 captures subject 100 (S406). Note that the operation in Step S406 is the same as Step S401, and thus the detailed description of Step S406 is omitted.

Next, controller 50 selects, as a piece of outline data 31 indicating a target value, a piece of outline data 31 resembling the outline of subject 100 when his/her left arm is bent at the target angle of the right arm rehabilitation (S407). That is to say, the piece of outline data 31 resembling the outline of subject 100 when subject 100 bends his/her left arm to the target angle is predetermined as the piece of outline data 31 indicating the target value. Here, a piece of outline data 31 indicating a state in which his/her arm is bent at, for example, 60 degrees is predetermined as the piece of outline data 31 indicating the target value. Note that in the present embodiment, no distinction, is made between the state in which subject 100 bends his/her left arm and the state in which subject 100 bends his/her right arm.

Next, after selecting the target value, controller 50 causes speaker 41 to output "Start rehabilitation" and turns on lighting fixture 42, for example (S408). Then, subject 100 starts the arm rehabilitation.

Next, camera 20 captures subject 100 (S409). Note that the operation in Step S409 is the same as Step S401, and thus the detailed description of Step S409 is omitted.

Next, controller 50 determines whether or not the angle indicated by a piece of outline data 31 resembling the state of subject 100 is greater than or equal to the target value indicated by the predetermined piece of outline data 31 (60 degrees in the present embodiment) (S410).

In the case of determining that the angle indicated by the piece of outline data 31 resembling the state of subject 100) is greater than or equal to the target value indicated by the predetermined piece of outline data 31 (Yes in S410), controller 50 causes lighting fixture 42 to output bright light having a high color temperature (S411).

In the case of determining that the angle indicated by the piece of outline data 31 resembling the state of subject 100 is less than the target value indicated by the predetermined piece of outline data 31 (No in S410), controller 50 turns off lighting fixture 42 (S412). In the present embodiment, when the state of subject 100 is a state in which his/her arm is bent at 50 degrees, for example, controller 50 determines that the target value indicated by the predetermined piece of outline data 31 is not reached.

Next, controller 50 determines whether or not the angle indicated by the piece of outline data 31 resembling the state of subject 100 is greater than or equal to the maximum value (45 degrees in the present embodiment) indicated by another one of the predetermined pieces of outline data 31 (S413).

In the case of determining that the angle indicated by the piece of outline data 31 resembling the state of subject 100 is less than the maximum value indicated by the predetermined piece of outline data 31 (No in S413), controller 50 finishes the rehabilitation game.

In the case of determining that the angle indicated by the piece of outline data 31 resembling the state of subject 100 is greater than or equal to the maximum value indicated by the predetermined piece of outline data 31 (Yes in S413), controller 50 updates the piece of outline data 31 stored in memory 30 and indicating the maximum value, and causes speaker 41 to output "Congratulations" (S414). In the present embodiment, the state of subject 100 was a state in which his/her arm was bent at 50 degrees, and thus the piece of outline data 31 indicating the state in which his/her arm is bent at 50 degrees is determined as a piece of outline data 31 indicating a new maximum value. By doing so, when the same subject 100 plays the rehabilitation game again, the piece of outline data 31 indicating the state in which his/her arm is bent at 50 degrees is read as the piece of outline data 31 indicating the maximum value in S404.

Then, the rehabilitation game is finished.

As described, motion detection system 1*a* can turn lengthy rehabilitation into an enjoyable game.

[Advantageous Effects]

Motion detection system 1*a* according to the present embodiment further includes wearing unit 70 which is to be worn on the body of subject 100 and which reflects some of the plurality of infrared rays emitted in a spatially-dispersed manner by infrared light source 10, and camera 20 captures the outline of subject 100 using the infrared rays reflected by subject 100 and wearing unit 70.

Wearing unit 70 makes it easier to reflect the plurality of infrared rays emitted by infrared light source 10, and thus camera 20 can more easily capture the part of subject 100 on which wearing unit 70 is worn.

Furthermore, wearing unit 70 includes infrared absorbing unit 71 and infrared reflecting unit 72.

Because wearing unit 70 to be captured by camera 20 partially has a characteristic region where the infrared rays are not reflected, camera 20 can more easily recognize small changes in subject 100 around wearing unit 70.

[Others]

Although the motion detection system according to the present disclosure has been described based on the above embodiments, the present disclosure is not to be limited to these embodiments.

Although output device 40 in the above embodiments includes at least one of speaker 41, lighting fixture 42, and mobile terminal 43, the present disclosure is not limited to this. For example, output device 40 may include speaker 41 alone, lighting fixture 42 alone, or mobile terminal 43 alone. Furthermore, output device 40 may include a display such as a TV or a personal computer (PC), for example.

Moreover, although the number of wearing units 70 worn on subject 100 is two in the above embodiments, the present disclosure is not limited to this. For example, the number of wearing units 70 worn on subject 100 may be three or greater. This allows camera 20 to capture subject 100 at higher precision.

Furthermore, although the motion detection system in the above embodiments is applied to the movement game, the coordination game, and the rehabilitation game, the present disclosure is not limited to these three games. For example, the motion detection system is applicable to a system where a child who has entered his/her room holds his/her own pose which is set in advance, to turn on a lighting fixture in his/her room. This gives the child enjoyment holding a pose of, for example, his/her favorite character every time he/she enters his/her room.

The motion detection system is also applicable to a system where, for example, a lighting fixture cannot be turned on unless an ordinary or elderly person raises his/her both hands. This could assist in, improving the health because the ordinary or elderly person naturally does upper arm exercise several times each day.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein, it is intended by the following claims to claim any and all modifications and variations that fall within the true scope of the present teachings.

What is claimed is:

1. A motion detection system that detects a subject, the motion detection system comprising:
    an infrared light source that emits a plurality of infrared rays in a spatially-dispersed manner;
    a camera that captures the subject using, among the plurality of infrared rays emitted by the infrared light source, infrared rays reflected by the subject;
    a memory that stores a plurality of pieces of outline data corresponding to a plurality of predetermined states of the subject;
    an output device that outputs information associated with a state of the subject; and
    a controller that controls the infrared light source, the camera, the memory, and the output device,
    wherein the controller performs the following:
    makes a comparison between an outline of the subject captured by the camera and the plurality of pieces of outline data stored in the memory;
    selects, from among the plurality of pieces of outline data, a piece of outline data which resembles the outline of the subject captured by the camera; and
    causes the output device to output information associated with a state of the subject corresponding to the selected piece of outline data,
    each of the plurality of infrared rays is emitted to a different position on the subject,
    the motion detection system further comprises:
    a wearing unit to be worn on a body of the subject, the wearing unit reflecting infrared rays among the plurality of infrared rays emitted in the spatially-dispersed manner by the infrared light source,
    the camera captures the subject using the infrared rays reflected by the subject and the wearing unit, and
    the wearing unit includes:
        an infrared absorbing unit that is a ring for absorbing infrared rays; and
        an infrared reflecting unit that is a sphere disposed on the ring for reflecting infrared rays.

2. The motion detection system according to claim 1, wherein the controller further performs the following:
    determines whether or not the selected piece of outline data matches a piece of outline data predetermined from among the plurality of pieces of outline data; and
    in the case of determining that the selected piece of outline data matches the predetermined piece of outline data, causes the output device to output information indicating that an actual state of the subject matches a state of the subject corresponding to the predetermined piece of outline data, as the information associated with the state of the subject corresponding to the selected piece of outline data.

3. The motion detection system according to claim 2, wherein, in the case of determining that the selected piece of outline data does not match the predetermined piece of outline data, the controller causes the output device to output information indicating that the actual state of the subject does not match the state of the subject corresponding to the predetermined piece of outline data, as the information associated with the state of the subject corresponding to the selected piece of outline data.

4. The motion detection system according to claim 1, wherein the output device includes a mobile terminal which outputs, as the information, a moving image associated with the state of the subject.

5. The motion detection system according to claim 1, wherein the output device includes a speaker which outputs, as the information, a sound associated with the state of the subject.

6. The motion detection system according to claim 1, wherein the output device includes a lighting fixture which outputs, as the information, light having light characteristics associated with the state of the subject.

* * * * *